(12) United States Patent
Karia et al.

(10) Patent No.: US 7,565,159 B2
(45) Date of Patent: Jul. 21, 2009

(54) METHODS AND ARRANGEMENT FOR IMPLEMENTING AN ACTIVE CALL HANDOVER BY EMPLOYING A SWITCHING COMPONENT

(75) Inventors: Snehal Karia, Fremont, CA (US); Atul Bhatnagar, Saratoga, CA (US); Weijian Qian, Fremont, CA (US); Prashant Chauhan, Sunnyvale, CA (US); Rajesh Palakkal, Groton, MA (US); Joshua Marder, Bellingham, MA (US); Rushika Panchal, Bangalore (IN)

(73) Assignee: Divitas Networks, Inc., Mountain View, CA (US)

( * ) Notice: Subject to any disclaimer, the term of this patent is extended or adjusted under 35 U.S.C. 154(b) by 0 days.

(21) Appl. No.: 11/748,041

(22) Filed: May 14, 2007

(65) Prior Publication Data
US 2008/0220781 A1    Sep. 11, 2008

Related U.S. Application Data

(63) Continuation-in-part of application No. 11/538,042, filed on Oct. 2, 2006, and a continuation-in-part of application No. 11/538,034, filed on Oct. 2, 2006, and a continuation-in-part of application No. 11/538,037, filed on Oct. 2, 2006, and a continuation-in-part of application No. 11/537,980, filed on Oct. 2, 2006, and a continuation-in-part of application No. 11/537,990, filed on Oct. 2, 2006, and a continuation-in-part of application No. 11/537,994, filed on Oct. 2, 2006, and a continuation-in-part of application No. 11/537,985, filed on Oct. 2, 2006.

(60) Provisional application No. 60/804,806, filed on Jun. 14, 2006.

(51) Int. Cl.
*H04W 4/00* (2009.01)

(52) U.S. Cl. ............... 455/461; 455/554.1; 455/554.2; 455/555; 455/551; 455/552.1; 370/229; 370/351; 370/352; 370/395.52; 370/467; 709/227; 709/228; 709/229; 379/88.25; 379/93.09; 379/93.11; 379/198; 379/225

(58) Field of Classification Search ............... 455/414.1, 455/426.2, 461, 554.2, 555, 551, 552.1, 465; 379/88.25, 93.09, 93.11, 100.01, 100.15, 379/198, 225, 230, 231, 234; 370/395.52, 370/351, 352, 467, 229; 709/227, 228, 229
See application file for complete search history.

(56) References Cited

U.S. PATENT DOCUMENTS 5,260,783 A    11/1993    Dixit (Continued)

FOREIGN PATENT DOCUMENTS

KR    10-1999-0012149 A    2/1999

(Continued)

OTHER PUBLICATIONS

"International Search Report", Issue in PCT Application No. PCT/US2007/071180; Mailing Date.: Mar. 25, 2008.

(Continued)

*Primary Examiner*—Charles N Appiah
*Assistant Examiner*—Olumide T Ajibade Akonai
(74) *Attorney, Agent, or Firm*—IP Strategy Group, P.C.

(57) ABSTRACT

An active call handover arrangement for managing a handover between a plurality of telecommunication devices associated with a public extension number is provided. The arrangement includes a mobility server configured to manage a telecommunication session between a telecommunication device of a third-party caller and a first telecommunication device of the plurality of telecommunication devices. The arrangement also includes a switch component configured to be associated with at least one telecommunication device of the plurality of telecommunication devices. At least one telecommunication device is configured to include mobility client software. The switch component is also configured to enable a user to perform the handover between the first telecommunication device and a second telecommunication device of the plurality of telecommunication devices.

17 Claims, 8 Drawing Sheets

U.S. PATENT DOCUMENTS

| | | | |
|---|---|---|---|
| 5,440,624 A | 8/1995 | Schoof, II | |
| 5,974,300 A | 10/1999 | LaPorta et al. | |
| 6,010,456 A | 1/2000 | Rhyne | |
| 6,073,175 A | 6/2000 | Tavs et al. | |
| 6,167,123 A * | 12/2000 | Kwok et al. | 379/100.01 |
| 6,223,055 B1 * | 4/2001 | Cyr | 455/555 |
| 6,259,920 B1 | 7/2001 | Kusaki et al. | |
| 6,288,739 B1 | 9/2001 | Hales et al. | |
| 6,388,584 B1 | 5/2002 | Dorward et al. | |
| 6,412,015 B1 | 6/2002 | Navare et al. | |
| 6,597,787 B1 | 7/2003 | Lindgren et al. | |
| 6,622,175 B1 | 9/2003 | Piller | |
| 6,650,640 B1 | 11/2003 | Muller et al. | |
| 6,760,303 B1 | 7/2004 | Brouwer | |
| 6,769,123 B1 | 7/2004 | Chan | |
| 6,801,948 B2 | 10/2004 | Clark et al. | |
| 6,822,943 B1 | 11/2004 | Mantin | |
| 6,907,501 B2 | 6/2005 | Tariq et al. | |
| 6,909,702 B2 | 6/2005 | Leung et al. | |
| 6,970,943 B1 | 11/2005 | Subramanian et al. | |
| 6,993,360 B2 | 1/2006 | Plahte et al. | |
| 7,127,263 B1 * | 10/2006 | Ihara | 455/465 |
| 7,133,669 B2 | 11/2006 | Nair et al. | |
| 7,376,129 B2 * | 5/2008 | Acharya et al. | 370/352 |
| 7,496,089 B2 * | 2/2009 | Hiroshima et al. | 370/353 |
| 2001/0046215 A1 | 11/2001 | Kim | |
| 2002/0067706 A1 | 6/2002 | Bautz et al. | |
| 2002/0076025 A1 | 6/2002 | Liversidge et al. | |
| 2002/0085516 A1 | 7/2002 | Bridgelall | |
| 2002/0131583 A1 | 9/2002 | Lu | |
| 2003/0005112 A1 | 1/2003 | Krautkremer | |
| 2003/0081741 A1 | 5/2003 | Anne et al. | |
| 2003/0087629 A1 | 5/2003 | Juitt et al. | |
| 2003/0119548 A1 | 6/2003 | Mohammed | |
| 2003/0177384 A1 | 9/2003 | Jones et al. | |
| 2004/0001446 A1 | 1/2004 | Bhatia et al. | |
| 2004/0001579 A1 | 1/2004 | Feinberg et al. | |
| 2004/0054787 A1 | 3/2004 | Kjellberg et al. | |
| 2004/0157585 A1 | 8/2004 | Sashihara | |
| 2004/0165530 A1 | 8/2004 | Bedekar et al. | |
| 2004/0218575 A1 | 11/2004 | Ibe et al. | |
| 2004/0260837 A2 | 12/2004 | Sjollema et al. | |
| 2004/0268148 A1 | 12/2004 | Karjala et al. | |
| 2005/0083886 A1 | 4/2005 | Ikeda | |
| 2005/0094618 A1 | 5/2005 | Colban et al. | |
| 2005/0113077 A1 | 5/2005 | Bushnell et al. | |
| 2005/0119001 A1 | 6/2005 | Watanabe | |
| 2005/0138176 A1 | 6/2005 | Singh et al. | |
| 2005/0138528 A1 | 6/2005 | Ameigeiras et al. | |
| 2005/0141691 A1 * | 6/2005 | Wengrovitz | 379/211.02 |
| 2005/0159157 A1 | 7/2005 | Bajko | |
| 2005/0265284 A1 | 12/2005 | Hsu et al. | |
| 2006/0036747 A1 | 2/2006 | Galvin, Jr. et al. | |
| 2007/0014259 A1 | 1/2007 | Fajardo et al. | |
| 2007/0091848 A1 | 4/2007 | Karia et al. | |
| 2007/0091907 A1 | 4/2007 | Seshadri et al. | |
| 2007/0094374 A1 | 4/2007 | Karia et al. | |
| 2007/0121580 A1 | 5/2007 | Forte et al. | |
| 2007/0133776 A1 * | 6/2007 | Jain et al. | 379/231 |
| 2007/0263830 A1 * | 11/2007 | Wengrovitz et al. | 379/219 |

FOREIGN PATENT DOCUMENTS

| | | | |
|---|---|---|---|
| KR | 10-2001-0028208 A | 4/2001 | |
| KR | 10-2002-0001980 A | 1/2002 | |
| KR | 10-2006-0031542 A | 4/2006 | |
| WO | WO-03/065682 A1 | 8/2003 | |
| WO | WO-2005/076649 A1 | 8/2005 | |
| WO | WO-01/33787 A | 5/2007 | |

OTHER PUBLICATIONS

"Written Opinion", Issue in PCT Application No. PCT/US2007/071180; Mailing Date.: Mar. 25, 2008.

"International Search Report", Issue in PCT Application No. PCT/US2006/38912; Mailing Date.: Feb. 12, 2008.

"Written Opinion", Issue in PCT Application No. PCT/US2006/38912; Mailing Date.: Feb. 12, 2008.

Reynolds, "Enabling Secure IP Telephony in Enterprise Networks", http://www.asociacion-aecsi.es/doc/Network/Enabling_Secure_IP_Telephony_in_Enterprise_Networks.pdf,(2001).

"International Search Report", Issue in PCT Application No. PCT/US2006/38869; Mailing Date.: Mar. 24, 2008.

"Written Opinion", Issue in PCT Application No. PCT/US2006/038869; Mailing Date.: Mar. 24, 2008.

"Written Opinion", Issue in PCT Application No. PCT/US2007/071181; Mailing Date.: Mar. 26, 2008.

"International Search Report", Issue in PCT Application No. PCT/US2007/071181; Mailing Date.: Mar. 26, 2008.

"International Preliminary Report on Patentability", Issued in PCT Application No. PCT/US2006/38912; Mailing Date: May 29, 2008.

"Written Opinion", Issue in PCT Application No. PCT/US2006/39115; Mailing Date: Jun. 16, 2008.

"International Search Report", Issue in PCT Application No. PCT/US2006/39115; Mailing Date: Jun. 16, 2008.

"International Preliminary Report on Patentability", Issued in PCT Application No. PCT/US2006/38911 Mailing Date: May 29, 2008.

"International Search Report", Issued in PCT Application No. PCT/US2007/071184; Mailing Date: May 19, 2008.

"Written Opinion", Issued in PCT Application No. PCT/US2007/071184; Mailing Date: May 19, 2008.

"Written Opinion", Issued in PCT Application No. PCT/US2007/071186; Mailing Date: May 16, 2008.

"International Search Report", Issued in PCT Application No. PCT/US2007/071186; Mailing Date: May 16, 2008.

"International Preliminary Report on Patentability", Issued in PCT Application No. PCT/US2006/38869; Mailing Date: May 28, 2008.

International Search Report, mailed Aug. 1, 2007, for International Application No. PCT/US06/38911; Filed on Oct. 3, 2006; Applicant: Lam Research Corporation.

Written Opinion, mailed Aug. 1, 2007, for International Application No. PCT/US 06/38911; Filed on Oct. 3, 2006; Applicant: Lam Research Corporation.

International Search Report, mailed Sep. 24, 2007, for International Application No. PCT/US 06/38870; Filed on Oct. 3, 2006; Applicant: Lam Research Corporation.

Written Opinion, mailed Sep. 24, 2007, for International Application No. PCT/US 06/38870; Filed on Oct. 3, 2006; Applicant: Lam Research Corporation.

International Search Report, mailed Aug. 2, 2007, for International Application No. PCT/US 06/38872; Filed on Oct. 3, 2006; Applicant: Lam Research Corporation.

Written Opinion, mailed Aug. 2, 2007, for International Application No. PCT/US 06/38872; Filed on Oct. 3, 2006; Applicant: Lam Research Corporation.

Shoen, John et al., "PCTEL Receives Critical Roaming Patent", Nov. 15, 2006; http://investor.pctel.com/ReleaseDetail.cfm?ReleaseID=218834.

Business Wire, "FirstHand Technologies Granted Patent for Multi-Protocol Data Communication System Supporting Wireless Telephony, Content Delivery", Nov. 28, 2006; http://www.tmcnet.com/usubmit/2006/11/28/2116925.htm.

U.S. Appl. No. 11/538,034, filed Oct. 2, 2006: Inventors: Palakkal, et al.

U.S. Appl. No. 11/538,037, filed Oct. 2, 2006; Inventors: Mittal, et al.

U.S. Appl. No. 11/755,710, filed May 30, 2007; Inventors: Wang.

U.S. Appl. No. 11/755,727, filed May 30, 2007; Inventors: Wang.

U.S. Appl. No. 11/755,702, filed May 30, 2007; Inventors: Prasad.

U.S. Appl. No. 11/755,704, filed May 30, 2007; Inventors: Mittal.

U.S. Appl. No. 11/537,985, filed Oct. 2, 2006; Inventors: Sharma, et al.

"International Preliminary Report on Patentability", Issued in PCT Application No. PCT/US06/38870; Mailing Date: Feb. 22, 2008.

"International Preliminary Report on Patentability", Issued in PCT Application No. PCT/US07/71181; Mailing Date: Dec. 8, 2008.

"International Preliminary Report on Patentability", Issued in PCT Application No. PCT/US07/71180; Mailing Date: Oct. 24, 2008.

"International Preliminary Report on Patentability", Issued in PCT Application No. PCT/US07/71184; Mailing Date: Nov. 4, 2008.

"International Preliminary Report on Patentability", Issued in PCT Application No. PCT/US07/71186; Mailing Date: Nov. 4, 2008.

"International Search Report", Issued in PCT Application No. PCT/US06/39101; Mailing Date: Jul. 17, 2008.

"Written Opinion", Issued in PCT Application No. PCT/US06/39101; Mailing Date: Jul. 17, 2008.

"International Search Report", Issued in PCT Application No. PCT/US2008/006184; Mailing Date: Sep. 29, 2008.

"Written Opinion", Issued in PCT Application No. PCT/US2008/006184; Mailing Date: Sep. 29, 2008.

* cited by examiner

| | User | Userid | Public Extension Number | Device | Private Extension Number |
|---|---|---|---|---|---|
| 512 | User 302 | S_k1 | 1234 | Desk Telephone 406 | 1232 |
| 514 | User 302 | S-k1 | 1234 | Mobility client handset 408 | 1234 |
| 516 | User 302 | S-k1 | 1234 | Softphone 410 | 1238 |
| 518 | User 302 | S-k1 | 1234 | Handset 412 | 1232 |
| 520 | User 302 | S-k1 | 1244 | Handset 3 | 1244 |
| 522 | User 302 | S-k1 | 1244 | Desk Telephone 2 | 1246 |
| 524 | User 302 | S-k1 | 1244 | Handset 4 | 1247 |

FIG. 5

METHODS AND ARRANGEMENT FOR IMPLEMENTING AN ACTIVE CALL HANDOVER BY EMPLOYING A SWITCHING COMPONENT

CROSS REFERENCE TO RELATED APPLICATIONS

This application is related to and claims priority under 35 U.S.C. §119(e) to a commonly assigned provisional patent application entitled "Advanced Mobile Communication Platform Apparatus and Method," by Kalkunte et al., application Ser. No. 60/804,806 filed on Jun. 14, 2006, which is incorporated by reference herein.

The present invention is a continuation-in-part of and claims priority 35 U.S.C. §120 to the following applications, all of which are incorporated herein by reference:

Commonly assigned application entitled "Enterprise-Managed Wireless Communication," by Karia et al., application Ser. No. 11/538,042 filed on Oct. 2, 2006;

Commonly assigned patent application entitled "Rendezvous Calling Systems and Methods Therefor," by Palakkal et al., application Ser. No. 11/538,034 filed on Oct. 2, 2006;

Commonly assigned patent application entitled "Call Routing Via Recipient Authentication," by Mittal et al., application Ser. No. 11/538,037 filed on Oct. 2, 2006;

Commonly assigned patent application entitled "Reducing Data Loss During Handoffs In Wireless Communication," by Karia et al, application Ser. No. 11/537,980 filed on Oct. 2, 2006;

Commonly assigned patent application entitled "Classification For Media Stream Packets In A Media Gateway," by Forte et al., application Ser. No. 11/537,990 filed on Oct. 2, 2006;

Commonly assigned patent application entitled "Secured Media Communication Across Enterprise Gateway," by Seshadri et al., application Ser. No. 11/537,994 filed on Oct. 2, 2006; and Commonly assigned patent application entitled "Enhancing User Experience During Handoffs In Wireless Communication," by Sharma et al., application Ser. No. 11/537,985 filed on Oct. 2, 2006.

BACKGROUND OF THE INVENTION

Telephones have long been employed to facilitate communication among users geographically dispersed. The desire and need to stay in touch have proliferated the usage of the telephones. As of today, telephones may come in different forms. In an example, a telephone may be a desk telephone, a mobile telephone, a soft IP (internet protocol) telephone, and the likes.

In modern society, a user may be associated with one or more telephones. In an example, a user may have a desk telephone and a mobile telephone. To reach the user, a third-party caller may need to know the telephone numbers associated with each telephone. To facilitate the communication process, the user may associate both telephones with a specific telephone number; thereby, both telephones may simultaneously ring when an incoming call is received.

To facilitate discussion, FIG. 1 shows a simple block diagram of a pair switching relationship. Consider the situation wherein, for example, a third-party caller 102 on a telephone 104 wants to make a telephone call to a user 106 within an enterprise 110. User 106 may possess two telephones, a desk telephone 108 and a mobile telephone 112. When third-party user 102 makes a telephone call, the connection may travel along a path 120 to establish a connection between telephone 104 and a plurality of telephones (desk telephone 108 and mobile telephone 112) via a private branch exchange (PBX) system 114. In this example, both of the user's telephones (desk telephone 108 and mobile telephone 112) have been configured to ring when an incoming call is received at a specific extension. User 106 is able to hear the request for a telecommunication session because both telephones are ringing. Once user 106 picks up one of the telephones, such as desk telephone 108, the other telephone (e.g., mobile telephone 112) will stop ringing.

While conversing with third-party caller 102, user 106 may want to switch from desk telephone 108 to mobile telephone 112. To perform a switch, user 106 may push a button 116 located on the telephone currently being employed (i.e., desk telephone 108) to cause the other telephone (i.e., mobile telephone 112) to ring. To switch over to the other telephone, user 106 may pick up the ringing mobile telephone 112 and then replace desk telephone 108.

In order to perform the aforementioned switch, mobile telephone 112 is specifically paired up with desk telephone 108. Pairing of the telephones creates a one-on-one relationship between the two telephones. Configuration to pair the two telephones may be performed by the administrator of the enterprise telephone system. The administrator may also have to configure at least one of the buttons on each of the paired telephones to enable switching to occur. The configuration process is a complex process that may require time and resources, thereby causing increased workload to the technology department and increased expenses.

Since pairing configuration is specifically between two telephones, a third telephone is unable to benefit from the pair switching relationship. In an example, a third telephone, such as a desk telephone 150, is not part of the relationship and is unable to receive the incoming telephone call to the extension associated with the paired telephones. In order to establish a relationship between desk telephone 150 and one of the paired telephones (i.e., desk telephone 108 and mobile telephone 112), the relationship between the paired telephones must first be terminated. In an example, the pair switching relationship between desk telephone 108 and mobile telephone 112 may first have to be terminated before a new relationship may be established between mobile telephone 112 and desk telephone 150.

The current method of pairing telephones to enable switching is an inflexible method that limits the number of telephones to two devices. Further, the cost of maintaining a telecommunication system that support pair switching relationships may become expensive in term of time and resources expended. In an example, since a typical enterprise may experience changes due to human resource (e.g., hire new employees, layoff employees, fire employees, etc.) and/or technological resource (e.g., telephone upgrade, new telephone design, new type of telephones, etc.), the enterprise's technology department may have to dedicate a significant portion of time and resources to manage communication needs of the enterprise.

To enable more than two telephones to receive an incoming call, a call park and pickup method may be implemented. Consider the situation wherein, for example, an incoming telephone call is received by the telephones in the enterprise. In an example, all three telephones, desk telephone 108, mobile telephone 112, and desk telephone 150 receive the incoming call. When a user picks up desk telephone 108, a communication session is established between the third-party caller's telephone and the user's desk telephone.

During the telephone conversation, the user needs to get some information at another location, which is located near desk telephone 150. To switch over to desk telephone 150, the user may first have to put the call on hold (i.e., park the call) and dial the extension for desk telephone 150. Once desk telephone 150 rings, the user may pick up the call at desk telephone 150 to continue the conversation with the third-party caller.

The call park and pickup method generally requires that each telephone be assigned to a different extension number since the PBX system is unable to dial an extension that is currently in use. Also, the call park and pickup method usually requires the user to enter the new extension number when a switch is desired. Accordingly, not only does the user have to know the desired extension number to perform the switch, but the call park and pickup method may be subject to human error. In addition, privacy is not ensured since another caller may intercept the call when the call is being parked.

BRIEF SUMMARY OF THE INVENTION

The invention relates, in an embodiment, to an active call handover arrangement for managing a handover between a plurality of telecommunication devices associated with a public extension number. The arrangement includes a mobility server configured to manage a telecommunication session between a telecommunication device of a third-party caller and a first telecommunication device of the plurality of telecommunication devices. The arrangement also includes a switch component configured to be associated with at least one telecommunication device of the plurality of telecommunication devices. At least one telecommunication device is configured to include mobility client software. The switch component is also configured to enable a user to perform the handover between the first telecommunication device and a second telecommunication device of the plurality of telecommunication devices.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which:

FIG. 5 shows, in an embodiment of the invention, a simple database.

DETAILED DESCRIPTION OF EMBODIMENTS

Figure 1:
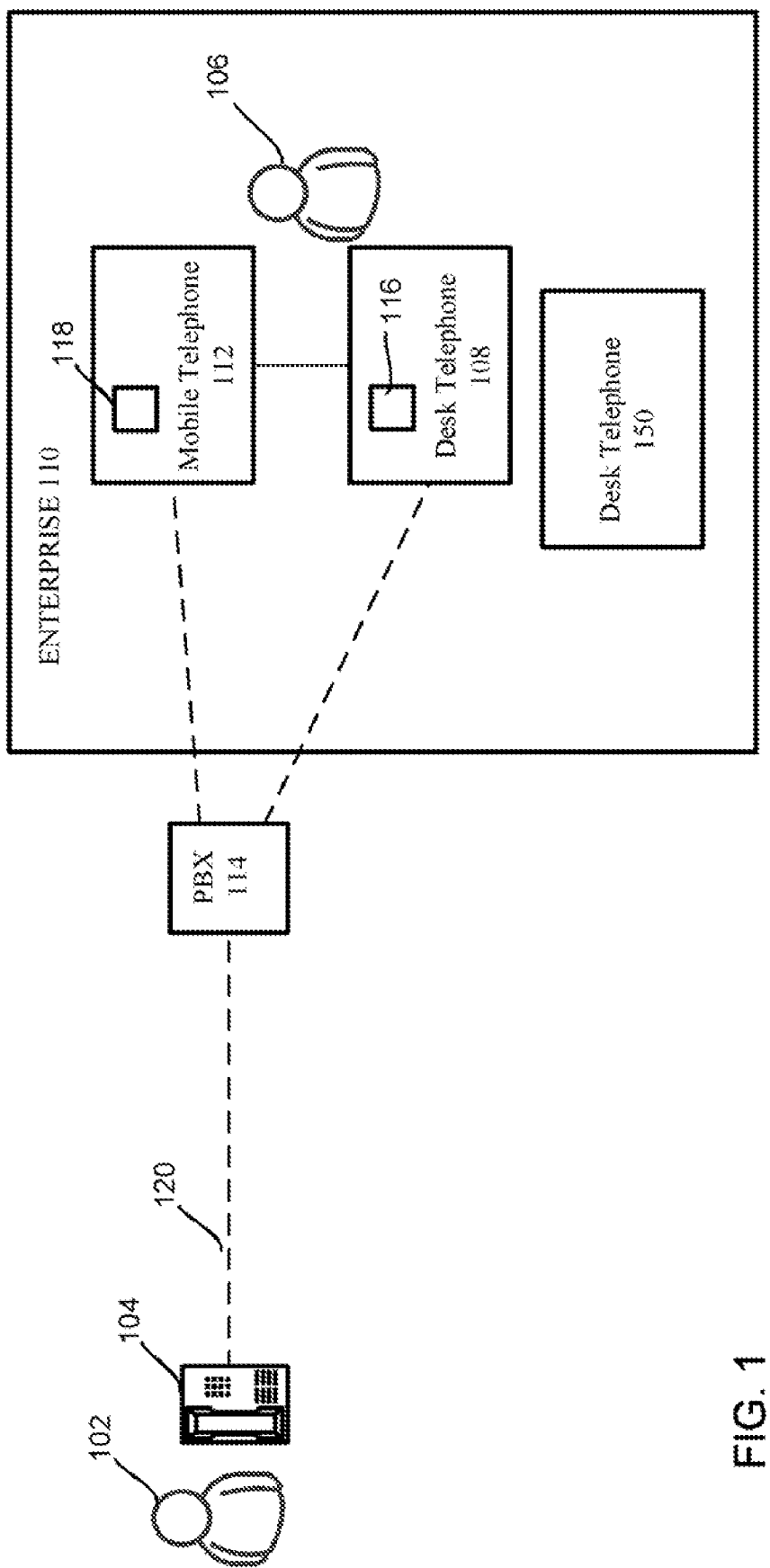
FIG. 1 shows a simple block diagram of a pair switching relationship.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with embodiments of the present invention, an active call handover arrangement is provided within a multiple telecommunication devices environment. Embodiments of the invention provide a method and/or arrangement that enable a plurality of telecommunication devices to be associated with a single public extension number by employing a mobility server. Embodiments of the invention also provide a switching component that enable handover to occur between the plurality of telecommunication devices.

In this document, various implementations may be discussed using a telephone as an example. This invention, however, is not limited to a telephone and may include any voice-operated devices. Instead, the discussions are meant as examples and the invention is not limited by the examples presented.

Also, in this document, various implementations may be discussed using a PBX system as an example. This invention, however, is not limited to a PBX system and may include any unified communication system. Instead, the discussions are meant as examples and the invention is not limited by the examples presented.

In an embodiment, a mobility server is employed to manage the telecommunication session between a member of an enterprise and a third-party caller. As discussed herein, a mobility server refers to a computer system that may manage and/or control both incoming and outgoing media traffic through an enterprise. In an embodiment of the invention, the mobility server may be connected to a unified communication system, such as a PBX system. In an embodiment of the invention, the mobility server may interact with a mobility client device (e.g., handset, laptop, etc.), which may be configured to include a mobility client software.

In an embodiment of the invention, an arrangement is provided in which a single extension number may be associated with a set of telecommunication devices. Consider the situation wherein, for example, a user is assigned a public extension number. In an embodiment, a mobility server may register the public extension number with a PBX system. Note that the public extension number may be registered with the PBX regardless if a user has been assigned to the public extension number. Also, the public extension number may only need to be registered once. Thus, during the course of normal business when an enterprise may hire and fire employees, the changes to the user associated with a public extension number essentially have minimal impact on the registration of the public extension number with the PBX system.

In an embodiment of the invention, a mobility server may be employed to store the relationship between a public extension number and a set of telecommunication devices. Unlike the prior art, the user is able to define the relationship between the public extension number and the telecommunication devices without having to be dependent upon the technology department to perform the mapping. In an example, the user may employ an interface to access the mobility server to define the relationship between the public extension number and the set of telecommunication devices. An unlimited number of telecommunication devices may be associated with a public extension number. Note that a physical limitation may exist based on the policy set by the enterprise and/or based on the physical capability of the telecommunication system of the enterprise.

In an embodiment, a handover may occur during an active telecommunication session by activating a switching component, such as a toggle button. The switching component may be a physical and/or a virtual component. Examples of a physical component may include a button, a key pad, and the likes. Examples of a virtual component may include a link, a menu item, and the likes.

Unlike the prior art, physical buttons on the telecommunication devices do not have to be configured in order to enable the telecommunication devices to perform switching. Instead, the ability for a telecommunication device to host a switching component depends upon whether or not the telecommunication device is a mobility client enabled device. In an example, if the telecommunication device has mobility client application program installed, the addition of a switching component may be as simple as downloading the new version of the software onto the telecommunication device. New features and/or updates to the switching component may be easily distributed by having the user download a new version of the mobility client software.

Unlike the prior art, each telecommunication device in a switching relationship does not have to have a switching component. Instead, handover may be performed by having a switching component installed on at minimum one telecommunication device. In an example, if a public extension number is associated with five different telecommunication devices, only one of the telecommunication devices may be required to house the switching component.

During a handover, a callstate is not transferred in the prior art. As discussed herein, a callstate refers to the state of the telecommunication session. In an example, a user may have put the call on-hold. In the prior art, the callstate of on-hold is not transferred when a handover occur. In an embodiment, the callstate of the current telecommunication session may be transferred when a handover occurs. In the same example, when a handover occurs, the callstate of on-hold is transferred to the new telecommunication session. Thus, the user is provided with control on when the user may want to resume the telephone conversation.

Similarly, a device state is not transferred during a handover in the prior art. As discussed herein, a device state refers to the state of the active telecommunication device. In an example, the user may have set the volume of his telephone at a high volume. In the prior art, the current volume setting on the active telecommunication device is usually not transferred over to the new active telecommunication device when a handover occurs. In an embodiment of the invention, the device state of the current active telecommunication device may be transferred when a handover occurs. In an example, when a handover occurs, the volume setting of the current telecommunication device is transferred to the new device. By transferring the device state, the user's experience is not impacted. Instead, the transition is seamless to the user since the user may still benefit from the previously active telecommunication device's configuration settings.

The features and advantages of the present invention may be better understood with reference to the figures and discussions that follow.

Figure 2:
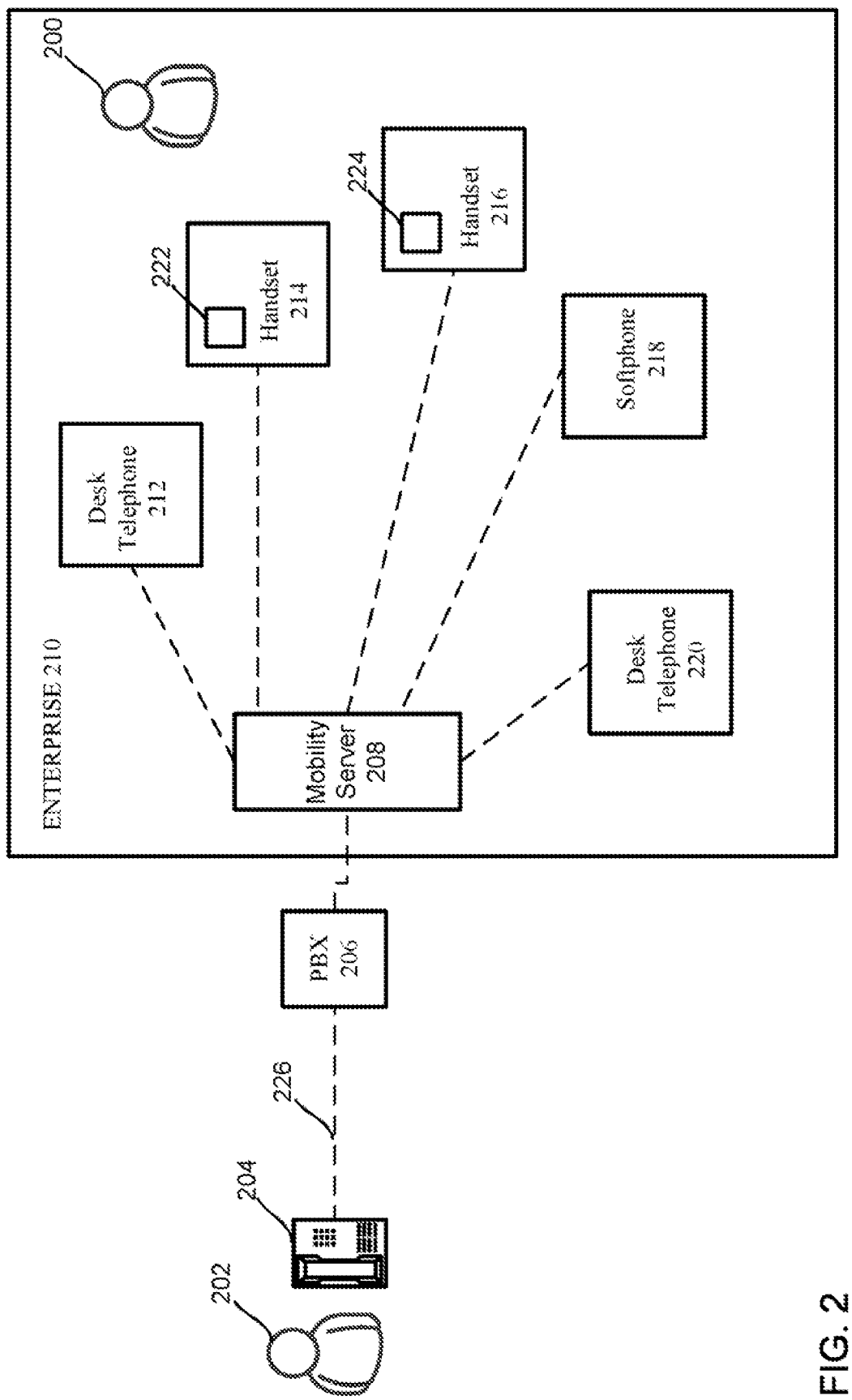
FIG. 2 shows, in an embodiment of the invention, a simple block diagram of a communication environment in which handover between multiple telecommunication devices may occur.

FIG. 2 shows, in an embodiment of the invention, a simple block diagram of a communication environment in which handover between multiple telecommunication devices may occur. Consider the situation wherein, for example, a third-party caller 202 employs a telephone 204 to call a user 200 within an enterprise 210. In this example, user 200 may be associated with a plurality of telecommunication devices (e.g., a desk telephone 212, a handset 214, a handset 216, a softphone 218, and a desk telephone 220). Unlike the prior art paired switching relationship, the user may be associated with more than two telecommunication devices.

The request for a telecommunication session may travel along a path 236 through a PBX 206. In an embodiment, PBX 206 may exist outside a mobility server environment. In another embodiment, PBX 206 may reside within a mobility server environment. As discussed herein, a mobility server refers to a computer system that may manage and/or control both incoming and outgoing media traffic through an enterprise.

The telecommunication session request is received by a mobility server 208, in an embodiment. Mobility server 208, upon receiving the telecommunication session request, may map the incoming telecommunication session request to one or more telecommunication devices that may be associated with a specific telephone number. In an embodiment, the specific telephone number is a public extension number. As discussed herein, a public extension number is a telephone number that is registered with a PBX system. Each public extension number may be associated with multiple private extension numbers. As discussed herein, a private extension number is a telephone number that may be associated with each telecommunication device. In an embodiment the private extension number may be the same extension number as fire public extension number. In another embodiment, a private extension number may be associated with one or more telecommunication devices.

When the incoming call from telephone 204 of the third-party caller is received by mobility server 208, all five telecommunication devices (desk telephone 212, handset 214, handset 216, softphone 218, and desk telephone 220) associated with the public extension number may ring. User 200 has the option of picking up any of the telecommunication devices to commence communication with third-party caller 202. In an example, user 200 may pick up desk telephone 212 to talk to third-party caller 202 on telephone 204.

During the conversation, user 200 may desire to switch to another telecommunication device. To switch to another telecommunication device, user 200 may activate a switch component, such as a toggle button. In this example, handsets 214 and 216 may have a toggle button 222 and a toggle button 224, respectively). In an embodiment, toggle buttons 222 and 224 may be a physical component (e.g., button) and/or a virtual component (e.g., menu item).

In an embodiment, the switch component is implemented in a telecommunication device (e.g., handset, laptop, computer, etc.) that may have mobility client software installed. As discussed herein, mobility client software refers to an application program that is capable of interacting with the mobility server. The mobility client software may be loaded onto a telecommunication device to enable the telecommunication device to interact with the mobility server.

In an example, user 200 wants to switch from desk telephone 212 to handset 216. To perform the switch, user 200 may press toggle button 224 to initiate the handover. In an embodiment, any switch component that may be located within a telecommunication device that is associated with the public extension number may be employed to perform the switch. Thus, the user could have also easily pressed toggle button 222 to initiate the handover.

The handover request is sent to mobility server 208. Upon receiving the handover request, mobility server 208 may send a telecommunication session request to the inactive telecommunication devices (i.e., headsets 214 and 216, softphone 218, and desk telephone 220). In an example, mobility server 208 may handle the handover request by causing the inactive telephones to ring. User 200 may then pick-up one of the ringing telecommunication devices, such as handset 216, to establish a telecommunication session between handset 216 and telephone 204. Accordingly, mobility server 208 may terminate the telecommunication session between desk telephone 212 and telephone 204.

Unlike the paired switching relationship of the prior art, the aforementioned handover method for multiple telecommunication devices does not require the technology department to configure the telecommunication devices in order to facilitate simultaneously ringing and to perform the handover. Instead, once the user has been assigned a public extension number, the user may register a plurality of telecommunication devices with the assigned public extension number. Further, the technology department is not required to perform complex configuration in order to activate the switching component. Instead, the user may easily download a mobility client onto one of his telecommunication devices in order to perform the handover, in an embodiment. As discussed herein, a mobility client refers to an application program that may be employed to manage telecommunication session.

Unlike the call park and pickup method of the prior art, the aforementioned handover method for multiple telecommunication devices may handle handover between telecommunication devices that share the same private extension number. Also, embodiments of the invention do not require the user to remember specific extension number in order to initiate the handover. Instead, the user may simply press a button, for example, to activate the handover. Thus, the chance for human error is significantly eliminated. Also, the likelihood of another party intercepting the call is also minimized.

Figure 3:
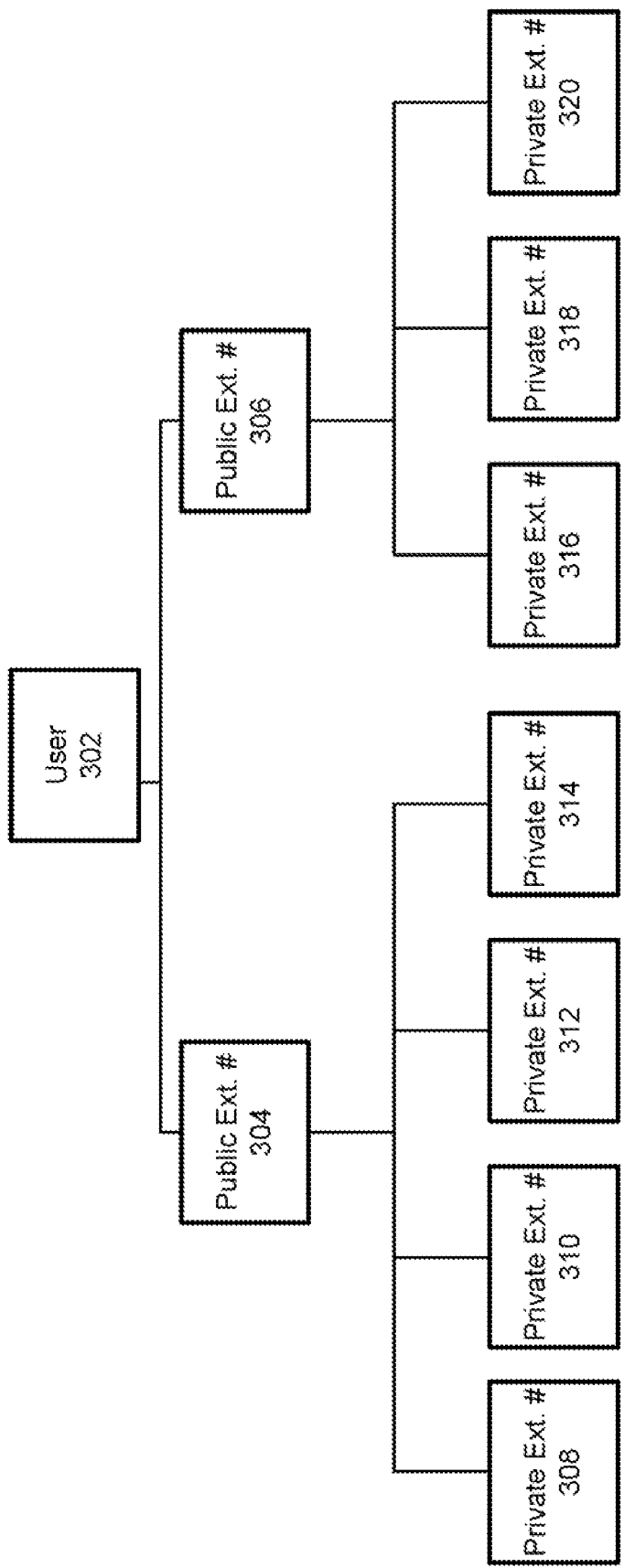
FIG. 3 shows, in an embodiment of the invention, a simple organizational chart illustrating a relationship between a user and one or more extension numbers.

FIG. 3 shows, in an embodiment of the invention, a simple organizational chart illustrating a relationship between a user and one or more extension numbers. A user 302 may be assigned one or more public extension numbers, such as public extension numbers 304 and 306. Unlike the prior art, a public extension number may be associated with a set of private extension numbers. In an example, public extension number 304 may be associated with private extension numbers 308, 310, 312, and 314. Similarly, public extension number 306 may be associated with private extension numbers 316, 318, and 320. The number of private extension numbers associated with a single public extension number may be limitless.

Figure 4:
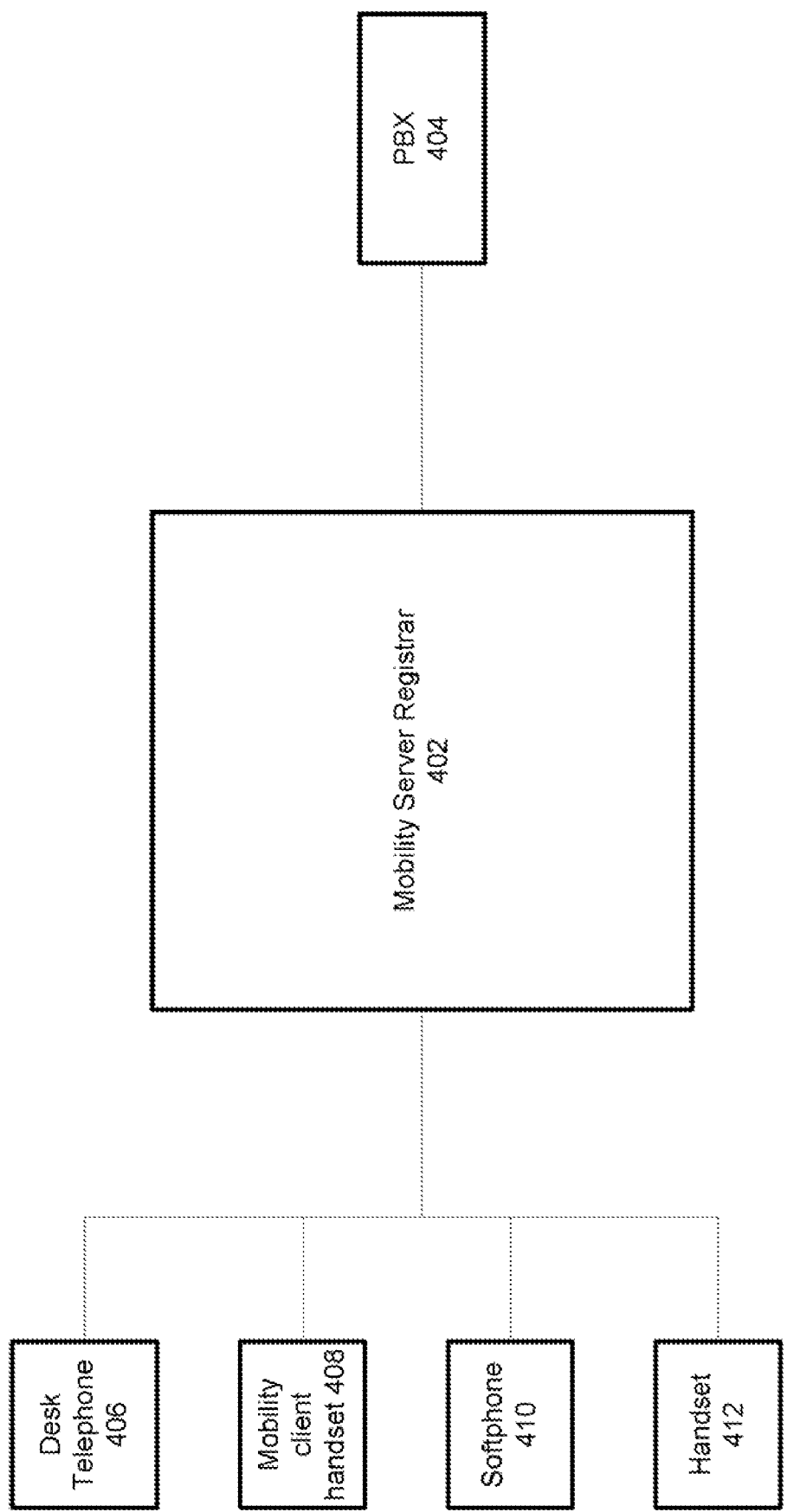
FIG. 4 shows, in art embodiment of the invention, a simple block diagram illustrating the registration process.

FIG. 4 shows, in an embodiment of the invention, a simple block diagram illustrating the registration process. FIG. 4 will be discussed in relation to FIG. 3. Consider the situation wherein, for example, user 302 has been assigned public extension number 304. A mobility server registrar 402 may register public extension number 304 with a PBX system 404. In an embodiment, registration with PBX system 404 may occur before and/or after a public extension number has been assigned to a user.

User 302 may associate one or more telecommunication devices with public extension number 304. In an example, user 302 may have 4 different telecommunication devices (a desk telephone 406, a mobility client handset 408, a softphone 410, and a handset 412. User 302 may register each of the telecommunication devices with mobility server registrar 402. In an embodiment, the registration process with mobility server registrar 402 establishes a relationship between public extension number 304 and the set of telecommunication devices, which in turn establishes a relationship with the private extension numbers associated with the telecommunication devices.

If user 302 needs to add or remove a telecommunication device, the user may simply perform this function without requiring administrative support from the technology department. Further, adding and/or removing a telecommunication device do not require the mobility server registrar to re-register with the PBX. Note that mobility server registrar 402 does not need to register with PBX system 404 unless a new public extension number has been assigned. For example, if user 302 is assigned a second public extension number (e.g., public extension number 306), mobility server registrar 402 may register the new public extension number with PBX system 404. However, if user 302 is no longer with the company and public extension 304 has been assigned to another user, mobility server registrar 402 is not required to re-register the public extension number.

FIG. 5 shows, in an embodiment of the invention, a simple database. A database 500 may include a plurality of data fields (e.g., a user data field 502, a userid data field 504, a public extension number data field 506, a device data field 508, and a private extension number data field 510) about a user and the telecommunication devices associated with the user. FIG. 5 will be discussed in relation to FIGS. 3 and 4 to help illustrate how the data may be stored.

Consider the situation wherein, for example, user 302 has been assigned two public extension numbers 304 and 306. Once a public extension number has been assigned and registered with the PBX system, the user may create the relationship between the public extension number and a set of telecommunication devices. In an example, user 302 may define the relationship by logging onto an interface (e.g., web interface) to associate a telecommunication device with the public extension number. For example, user 302 may associate public extension number 304 with desk telephone 406. In database 500, the relationship is shown in a data row 512. As shown in data row 512, user 302 with a userid of S_k1 has a public extension number 1234 associated with desk telephone 406, which has a private extension number of 1232.

As can be seen from database 500, user 302 may also be associated with more than one public extension number (as shown by extension numbers 1234 and 1244). Each public extension number may be associated with a set of telecommunication devices. In an example, public extension number 304 (with extension number 1234) is associated with 4 different telecommunication devices and public extension number 306 (with extension number 1244) is associated with three telecommunication devices. The private extension number may differ from the public extension number (data rows 512, 516, 518, 522, and 524) and/or be the same as the public extension number (datarows 514 and 520). In an embodiment, telecommunication devices may also share private extension number, such as desk telephone 406 and handset 412 (with private extension number 1232).

In an embodiment, the database may be stored within a mobility server (e.g., MCA server). Thus, when a handover request is initiated, the mobility server is able to access the database to retrieve the necessary data to facilitate handover between the various telecommunication devices associated with a specific public extension number. In an example, user 302 is currently conversing with a third-party caller on desk telephone 406 via public extension number 304. When user 302 wants to switch over to another telephone, such as softphone 410, user 302 may activate a switch component. The handover request is received by a mobility server, which may access database 500 to identify the telecommunication devices associated with public extension number 304. By utilizing the database, the mobility server is able to provide instruction to the correct inactive telecommunication devices to ring.

In the prior art call park and pickup method, the PBX system is generally unable to transfer a call between two telecommunication devices when both telecommunication devices are associated with the same extension number since the PBX system may not have access to data about the telecommunication devices. Unlike the prior art, the mobility server is not limited by the extension numbers. In other words, the mobility server is able to perform the handover regardless if the telecommunication devices share the same extension number. Consider the situation wherein, for example, user 302 is currently employing desk telephone 406 to communicate with a third-party caller. When user 302 decides to switch over to another telecommunication device, the mobility server will cause handset 412 to ring, along with the other inactive telecommunication devices, even though handset 412 and desk telephone 406 share the same private extension number. The mobility server is able to perform the handover because the mobility server is able to access database 500, which may not only include the private extension number but may also provide information about the telecommunication devices associated with the private extension number.

Figure 6:
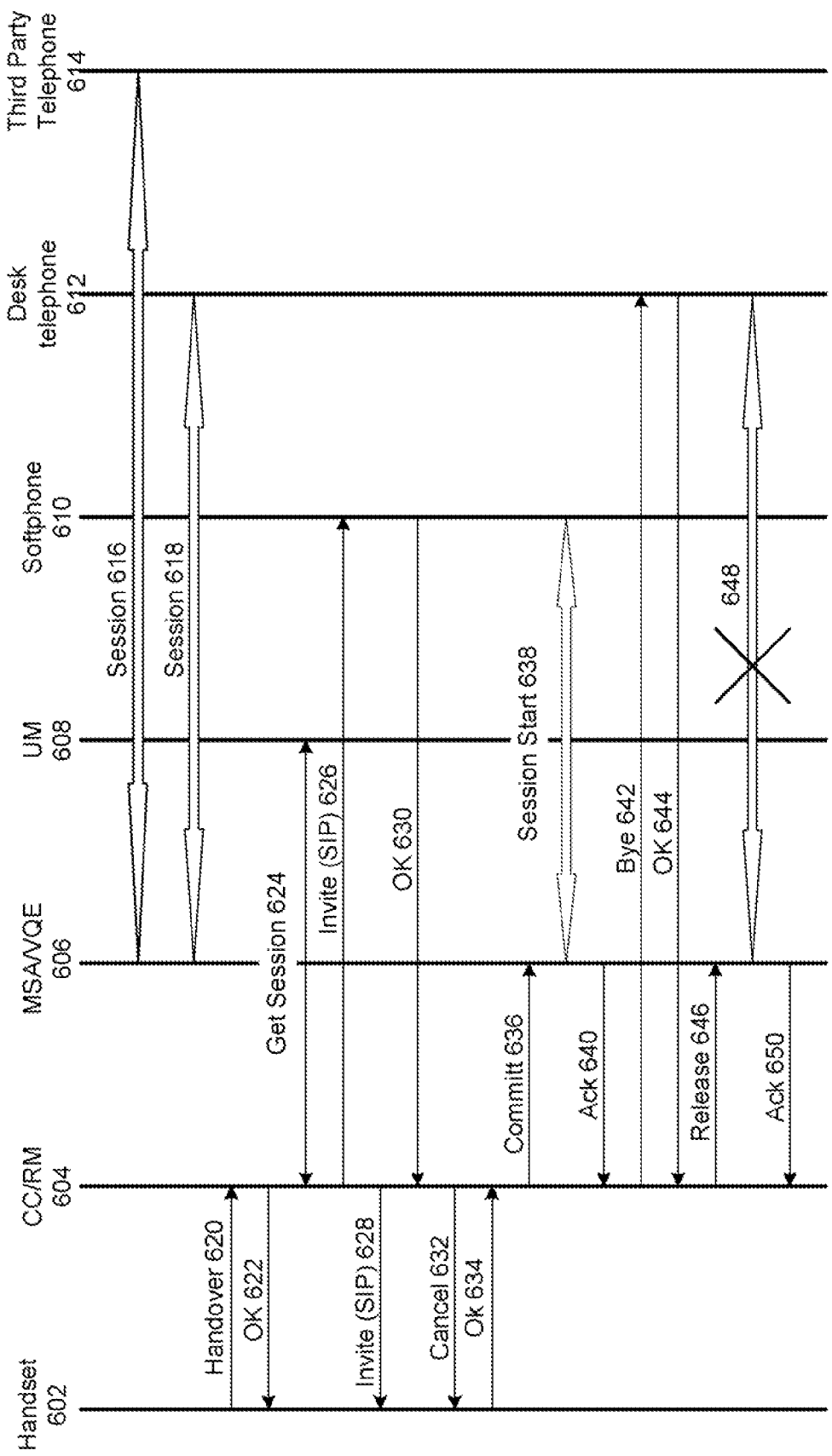
FIG. 6 shows, in an embodiment of the invention, a simple call flow of a handover between a desk telephone and a handset.

FIG. 6 shows, in an embodiment of the invention, a simple call flow of a handover between a desk telephone and a handset. A telecommunication session is currently active between a third-party telephone 614 and a desk telephone 612. The telecommunication session is being handled by a media server and voice quality engine (MSA/VQE) 606. In an example, a telecommunication session may include a telecommunication connection session 616, which is established between third-party telephone 614 and MSA/VQE 606, and a telecommunication connection session 618, which is established between MSA/VQE 606 and desk telephone 612.

During the telecommunication session, the user of desk telephone 612 may decide to switch to another telephone. To initiate the handover, the user may activate a switch component (e.g., press a toggle button) that may be located on mobility client enhanced telecommunication device, such as a handset 602, for example. A handover message 620 is sent to a call control/resource manager (CC/RM) 604 in order to start the handover process. CC/RM 604, upon receiving the handover message, may send an okay message 622 back to handset 602. At about the same time CC/RM 604 may be sending a get session message 624 to a user manager (UM) 608 to request for data about the current telecommunication connection sessions (616 and 618). The data that CC/RM 604 may receive may include, but are not limited to, which telecommunication device is active, which telecommunication device is inactive, which telecommunication device has been registered, and the likes.

Once CC/RM 604 has received the session data, CC/RM 604 may send an invite message (e.g., SIP invite message) to the inactive telecommunication devices. In an example, CC/RM 604 may send an invite message 626 to a softphone 610 and an invite message 628 to handset 602. Note that the invite SIP message may be represented by a ringing of the telecommunication device.

If the user picks up softphone 610, then softphone 610 may send an okay message 630 to CC/RM 604. Upon receiving the okay message, CC/RM 604 may send a cancel message 632 to handset 602. Handset 602 may then send an okay message 634 and may stop ringing.

Meanwhile, CC/RM 604 may send a commit message 636 to MSA/VQE 606. Upon receiving the commit message, a telecommunication connection session 638 is established between MSA/VQE 606 and softphone 610. In other words, a new media stream connection is formed between softphone 610 and MSA/VQE 606 and the user may now employ softphone 610 to communicate with third-party telephone 614. An acknowledgement message 640 is also sent by MSA/VQE 606 to CC/RM 604.

To terminate the telecommunication connection session between MSA/VQE 606 and desk telephone 612, CC/RM 604 may send a bye message 642 to desk telephone 612. In return, desk telephone 612 may send an okay message 644 back to the CC/RM 604. Upon receiving the okay message, CC/RM 604 may send a release message 646 to MSA/VQE 606 in order to instruct MSA/VQE 606 to terminate telecommunication connection session 618 between MSA/VQE 606 and desk telephone 612 (as shown by x-out session 648). Once the session has been disconnected, MSA/VQE 606 may send an acknowledgement message 650 to CC/RM 604.

Figure 7:
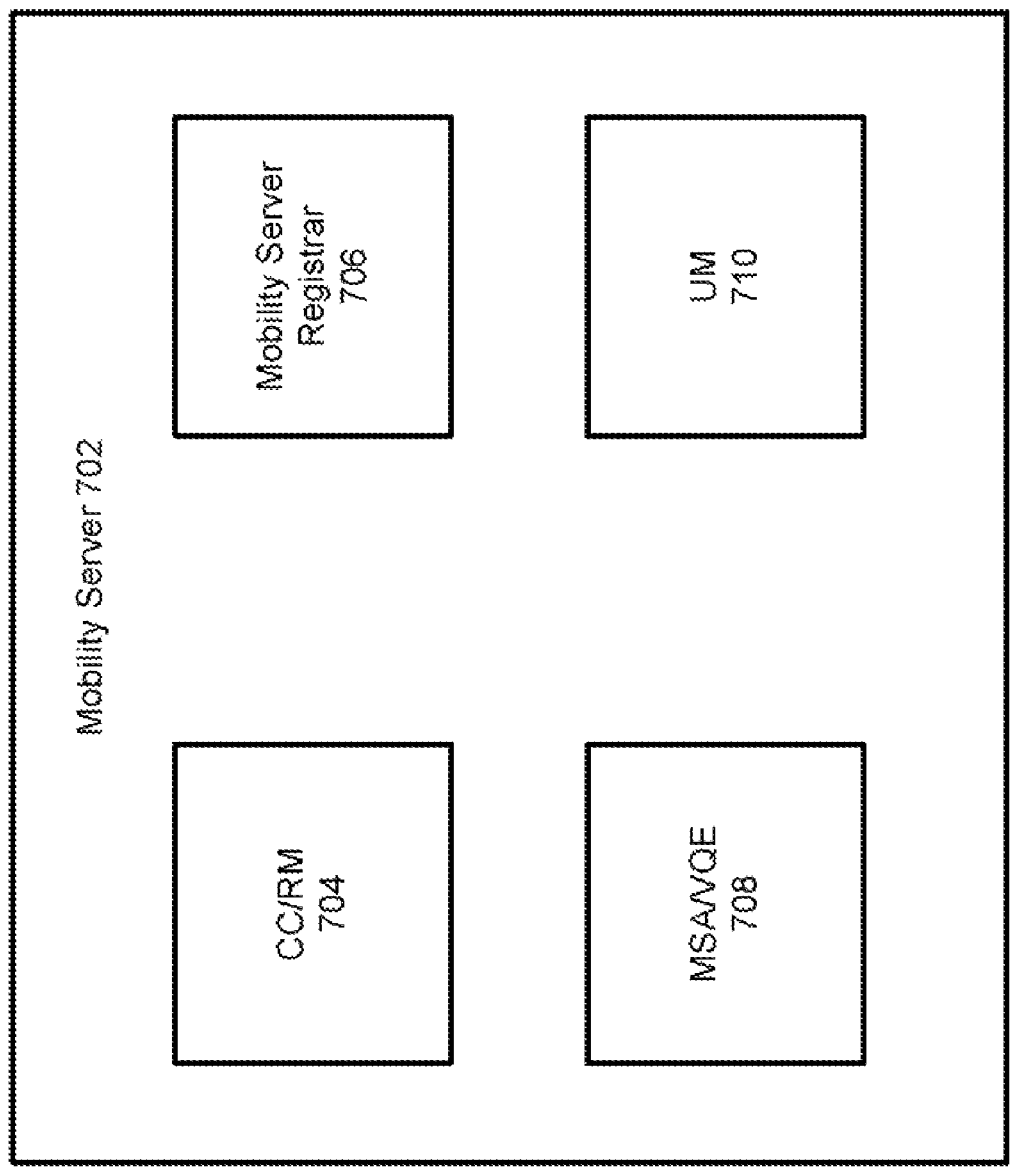
FIG. 7 shows, in an embodiment of the invention, examples of components that may be implemented in a mobility server.

FIG. 7 shows, in an embodiment of the invention, examples of components that may be implemented in a mobility server. A mobility server 702 may include a plurality of components, including a CC/RM 704, a MSA/VQE 708, a mobility server registrar 706, and a UM 710.

CC/RM 704 may be configured to identify the telecommunication device that may be associated with a user. CC/RM 704 may also identify the status of each telecommunication devices. In an example, CC/RM 704 may identify which telecommunication device is actively participating in a telecommunication session and which telecommunication device is currently inactive.

MSA/VQE 708 may be configured to monitor and handle IP packets (e.g., voice packets), decode and encode data (e.g., voice), and encryption and decryption of secure transmission of data. MSA/VQE 70S may also be configured to ensure the voice quality of the telecommunication session. Further, MSA/VQE 708 may be configured to ensure that a smooth transition may exist during a handover between telecommunication devices.

Mobility server registrar 706 may be configured to perform the registration of a public extension number with a PBX system. Also, mobility server registrar 706 may be configured to accept the registration of one or more telecommunication devices with the public extension number.

UM 710 may be configured to manage a user's telecommunication relationship within an enterprise. In other words, UM 706 may be employed to map a public extension number to a set of private extension numbers.

Figure 8:
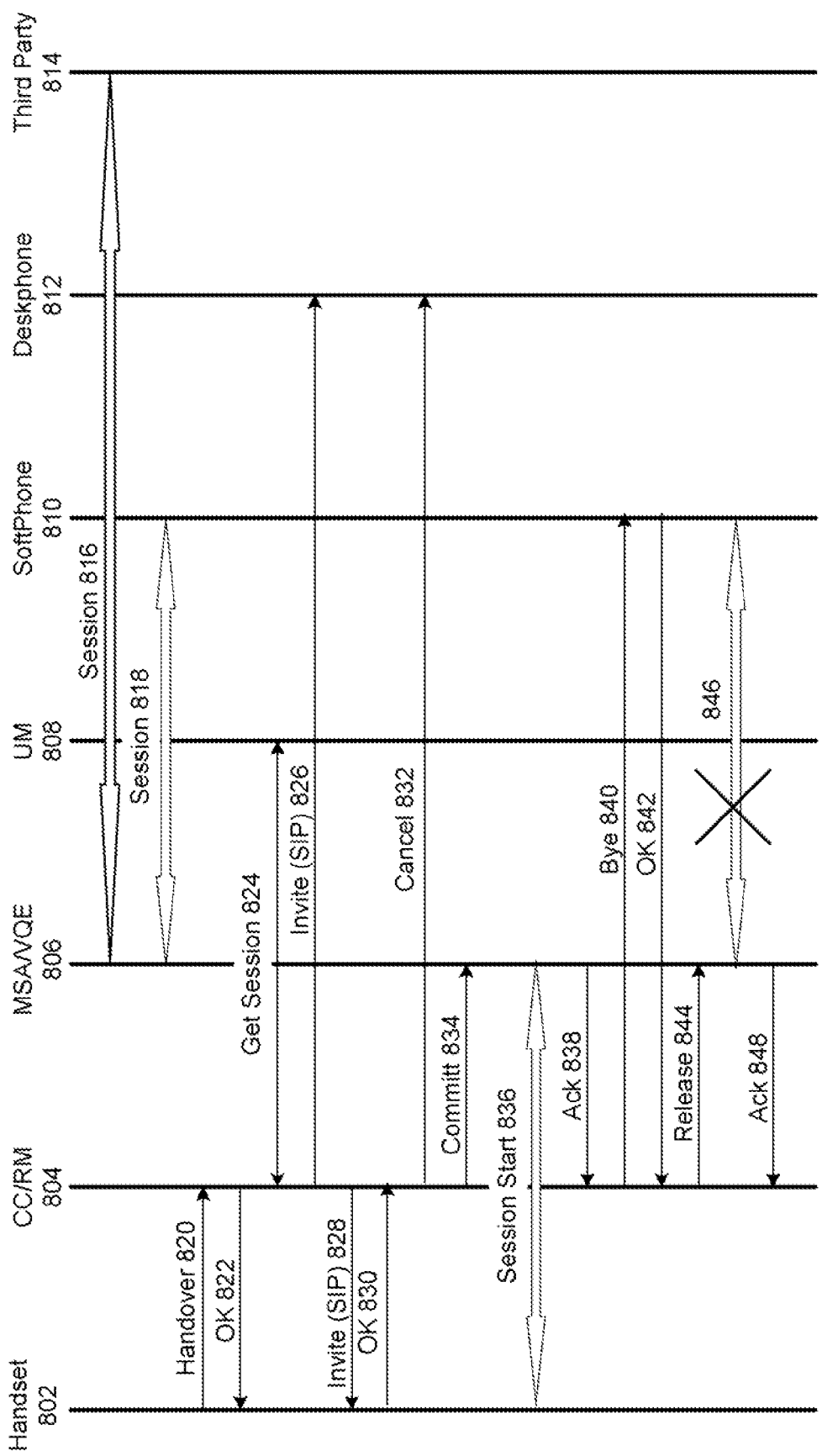
FIG. 8 shows, in an embodiment of the invention, a simple call flow illustrating a handover between a softphone and a handset.

FIG. 8 shows, in an embodiment of the invention, a simple call flow illustrating a handover between a softphone and a handset. Similar to FIG. 6, a telecommunication session is currently active between a third-party telephone 814 and a softphone 810. The telecommunication session is being handled by a media server and voice quality engine (MSA/VQE) 806 in which a telecommunication connection session 816 is established between third-party telephone 814 and MSA/VQE 806 and another telecommunication connection session 818 is established between MSA/VQE 806 and softphone 810.

During the telecommunication session, the user of softphone 810 may decide to switch to another telephone. To initiate the handover, the user may activate a switch component (e.g., press a toggle button) on a mobility client enhanced telecommunication device, such as a handset 802, for example. A handover message 820 may be sent to a CC/RM 804 to start the handover process. Upon receiving this handover message, CC/RM 804 may send an okay message 822 back to handset 802. Meanwhile, CC/RM 804 may be sending a get session message 824 to a UM 808 to request for data about the current telecommunication connection sessions (716 and 718).

Once CC/RM 804 has received the session data, CC/RM 804 may send an invite message (e.g., SIP invite message) to the inactive telecommunication devices. In an example, CC/RM 804 may send invite messages 826 and 828 to a desk telephone 812 and handset 802, respectively. Note that the invite SIP message may be represented by a ringing of the telecommunication device.

In the prior art, a callstate and/or device state may not be transferred to the new active telecommunication device during a handover. In an embodiment of the invention, a callstate and/or a device state may also be sent along with invite messages 826 and 828. The inclusion of the callstate and/or device state is an enhancement to the current Session Description Protocol (SDP), which is defined in the Request For Comments (RFC) 2327. Those skilled in the arts are familiar with SDP and RFC 2327 so no further discussion will be provided.

In an embodiment, the enhancement to the SDP may include a set of new attribute fields to identify the callstate and/or the device state. In an example, the callstate may include a set of values defining the state of the telecommunication session, such as on-hold, parked, transfer in progress, and the likes. In another example, the device state may include a set of values defining the state of the device, such as mute, volume control, and the likes.

As aforementioned, the user wants to switch from softphone 810 to handset 802. Assume also that the user has put the call on-hold, which is a callstate, before initialing the handover. In the prior art, the callstate of the current telecommunication device is usually not transferred from one telecommunication device to the next during a handover. In an example, once a telecommunication session has been established between third-party telephone 814 and handset 802, the third-party caller is immediately able to continue his conversation with the user. The user is not given the opportunity to determine when a call may be resumed.

Embodiments of the invention enable the callstate to be transferred between telecommunication devices. By transferring the callstate, the user has an additional control in managing the telecommunication session. In an example, once a telecommunication session has been established between a third-party telephone 814 and handset 802, the telecommunication session remains in an on-hold state to provide the user with the choice of determining when the call may be resumed.

In an embodiment of the invention, the device state of the telecommunication device may also be transferred during a handover. In an example, the user has set the volume setting on softphone 810 to a preferred level that provides the best user experience. When a handover occurs between softphone 810 and handset 802, the device state is transferred to handset 802 enabling the user to continue to enjoy a best user experience. In other words, the volume level of softphone 810 is transferred to handset 802 and the volume of handset 802 is adjusted in order to provide the user with the same user experience, thereby providing the user with a seamless handover.

Referring back to the call flow of FIG. 8, once the invite has been sent, the user may pick up one of the telecommunication devices. In an example, the user may pick up handset 802 to continue his telecommunication session with the third-party caller. By picking up handset 802, an okay message 830 may be sent to CC/RM 804. Upon receiving the okay message, CC/RM 804 may send a cancel message 832 to desk telephone 812 to cancel the ringing.

In addition, CC/RM 804 may send a commit message 834 to MSA/VQE 806. Upon receiving the commit message, a telecommunication connection session 836 is established between MSA/VQE 806 and handset 802. Accordingly, a new media stream connection 836 is created between handset 802 and MSA/VQE 606 and the user may now employ handset 802 to communicate with third-party telephone 814. In addition, MSA/VQE 806 may send an acknowledgement message 838 to CC/RM 804.

To terminate the telecommunication connection session between MSA/VQE 806 and softphone 810, CC/RM 804 may send a bye message 840 to softphone 810 and softphone 810 may send an okay message 842 in return. Upon receiving the okay message, CC/RM 804 may send a release message 844 to MSA/VQE 806 instructing MSA/VQE 806 to disconnect from softphone 810 (as shown by x-out session 846). Once the session has been terminated, MSA/VQE 806 may send an acknowledgement message 848 to CC/RM 804.

As can be appreciated from the foregoing embodiment invention, an active call handover within a multiple telecommunication device is facilitated by a mobility server. With a mobility server, the configuration of the relationship between the telecommunication devices to enable handover may be performed with minimum input from the technology department. As a result, the time and cost associated with managing the telecommunication devices in order to enable handover is significantly reduced. Further, embodiments of the invention also provide for callstate and/or device state to be transferred during a handover to minimize the disruption during a handover and to maximize a user's telecommunication experience.

While this invention has been described in terms of several preferred embodiments, there are alterations, permutations, and equivalents, which fall within the scope of this invention.

Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A system for enabling at least a user to perform communication using at least one telecommunication device among a plurality of telecommunication devices, said plurality of telecommunication devices being associated with a public extension number, said public extension number being associated with said user, said plurality of devices including at least a first telecommunication device and a second telecommunication device, the system comprising:
   a switch component implemented on said first telecommunication device for enabling said first telecommunication device to provide a handover request message; and
   a mobility server configured to manage at least a telecommunication session between a caller telecommunication device used by a caller and said first telecommunication device, said mobility server being further configured to receive said handover request message, said mobility server being further configured to send a first invite message to said second telecommunication device in response to said handover request message, said mobility server being further configured to establish a telecommunication session between said caller telecommunication device and said second telecommunication device if said mobility server receives an approval message from said second telecommunication device, said approval message responding to said first invite message, said mobility server being further configured to provide information of a device state to said second telecommunication device before or when establishing said telecommunication session between said caller telecommunication device and said second telecommunication device, said device state including a volume setting of said first telecommunication device during said telecommunication session between said caller telecommunication device and said first telecommunication device.

2. The system of claim 1 wherein said mobility server is configured to interact with a unified communication system.

3. The system of claim 2 wherein a registrar of said mobility server is employed to register said public extension number with said unified communication system.

4. The system of claim 3 further comprising a user interface for said user to employ said mobility server to associate a plurality of private extension numbers, which are associated with said plurality of telecommunication devices, with said public extension number.

5. The system of claim 1 wherein said first invite message is represented by a ringing of said second telecommunication device.

6. The system of claim 1 wherein said mobility server is further configured to send a second invite message to a third telecommunication device of said plurality of telecommunication devices in response to said handover request.

7. The system of claim 1 wherein said mobility server is further configured to provide information of a callstate to said second telecommunication device before or when establishing said telecommunication session between said caller telecommunication device and said second telecommunication device, said callstate being a state of said telecommunication session between said caller telecommunication device and said first telecommunication device.

8. A method for enabling at least a user to perform communication using at least one telecommunication device among a plurality of telecommunication devices, said plurality of telecommunication devices being associated with a public extension number, said public extension number being associated with said user, said plurality of devices including at least a first telecommunication device and a second telecommunication device, the method comprising:
   enabling a first telecommunication session, said first telecommunication session being between a caller telecommunication device used by a caller and said first telecommunication device;
   receiving a handover request from said first telecommunication device;
   sending a first invite message to said second telecommunication device in response to said receiving;
   establishing a second telecommunication session if a mobility server receives an approval message from said second telecommunication device, said second telecommunication session being between said caller telecommunication device and said second telecommunication device, said approval message responding to said first invite message; and
   transferring information of a device state to said second telecommunication device before or during said establishing, said device state including a volume setting of said first telecommunication device during said first telecommunication session.

9. The method of claim 8 further comprising sending a bye message to said first telecommunication device after said establishing.

10. The method of claim 9 further comprising terminating said first telecommunication session in response to an acknowledgement message provided by said first telecommunication device, said acknowledgement message responding to said bye message.

11. The method of claim 8 further comprising using said first invite message to cause said second telecommunication device to ring.

12. The method of claim 8 further comprising:
   sending a second invite message to a third telecommunication device of said plurality of telecommunication devices in response to said handover request; and
   establishing a third telecommunication session if said mobility server receives an acknowledgement message from said third telecommunication device, said third telecommunication session being between said caller telecommunication device and said third telecommunication device, said acknowledgement message responding to said second invite message.

13. The method of claim 8 further comprising transferring information of a callstate to said second telecommunication device before or during said establishing, said callstate being a state of said first telecommunication session.

14. An article of manufacture comprising a program storage medium having computer readable code embodied therein, said computer readable code being configured for enabling at least a user to perform communication using at least one telecommunication device among a plurality of telecommunication devices, said plurality of telecommunication devices being associated with a public extension number, said public extension number being associated with said user, said plurality of devices including at least a first telecommunication device and a second telecommunication device, the article of manufacture comprising:
- code for enabling a first telecommunication session, said first telecommunication session being between a caller telecommunication device used by a caller and said first telecommunication device;
- code for receiving a handover request from said first telecommunication device;
- code for sending a first invite message to said second telecommunication device in response to said receiving;
- code for establishing a second telecommunication session if a mobility server receives an approval message from said second telecommunication device, said second telecommunication session being between said caller telecommunication device and said second telecommunication device, said approval message responding to said first invite message; and
- code for transferring information of a device state to said second telecommunication device before or during said establishing, said device state including a volume setting of said first telecommunication device during said first telecommunication session.

15. The article of manufacture of claim 14 further comprising code for using said first invite message to cause said second telecommunication device to ring.

16. The article of manufacture of claim 14 further comprising:
- code for sending a second invite message to a third telecommunication device of said plurality of telecommunication devices in response to said handover request; and
- code for establishing a third telecommunication session if said mobility server receives an acknowledgement message from said third telecommunication device, said third telecommunication session being between said caller telecommunication device and said third telecommunication device, said acknowledgement message responding to said second invite message.

17. The article of manufacture of claim 14 further comprising code for transferring information of a callstate to said second telecommunication device before or during said establishing, said callstate being a state of said first telecommunication session.

* * * * *